Patented Aug. 21, 1951

2,565,398

UNITED STATES PATENT OFFICE 2,565,398

PRODUCTION OF OXIDATION RESISTANT HIGH MOLECULAR WEIGHT PENTADIENE COPOLYMERS

Henry G. Schutze, Baytown, Tex., assignor, by mesne assignments, to Standard Oil Development Company, Elizabeth, N. J., a corporation of Delaware No Drawing. Application July 15, 1948, Serial No. 38,946

4 Claims. (Cl. 260—85.3)

The present invention has to do with the polymerization of olefins to produce high molecular weight polymers. More particularly, it is directed to the production of high molecular weight polymers by the polymerization of a tertiary mono-olefin with 4-methyl-1,3 pentadiene at subatmospheric temperatures.

Prior to the present invention, it has been conventional practice to form a mixture of a tertiary mono-olefin such as isobutylene with a di-olefin such as isoprene which is polymerized at a temperature in the range between —50° and —175° F. in the presence of a Friedel-Crafts catalyst such as aluminum chloride to form a high molecular weight polymer having vulcanizable characteristics. The amount of diolefin employed in admixture with the tertiary mono-olefin has been regulated to control the number of unsaturated linkages in the polymer which in turn controls the ability of the polymer to be vulcanized.

The foregoing described process has achieved commercial success but difficulty has attended the production of the high molecular weight polymer in view of the limited number of unsaturated bonds available in the polymer produced in the process. It is believed that the reason that the number of unsaturated bonds in the polymer is limited is due to the fact that the reaction proceeds through the carbonium ion which is terminated by the loss of a proton to the $AlCl_4^-$ ion. It is believed that the proton is lost most readily when the terminal carbonium structure contains a primary carbonium arrangement. Thus, it is postulated that such an arrangement is always obtained when either isoprene or butadiene is utilized for the diolefin in the foregoing reaction. Thus, in the conventional reaction between isobutylene and isoprene, for example, the proton is lost so readily that it is difficult to produce high molecular weight polymers having the proper vulcanizable characteristics, and it is even more difficult when butadiene is the diolefin.

It is believed that the true catalyst for the polymerization reaction is not the Friedel-Crafts catalyst, aluminum chloride, per se, but it is believed to be the acid $HAlCl_4$ which is formed in the following manner:

$$AlCl_3 + HCl \rightarrow HAlCl_4$$

This acid, $HAlCl_4$, is believed to ionize in the solution of alkyl halide in which the aluminum chloride is usually employed. This ionization is believed to proceed in accordance with the following equation:

$$HAlCl_4 \rightarrow H^+ + AlCl_4^-$$

Thus, it can be seen that the ratio of $HAlCl_4$ to $AlCl_3$ in the catalyst may be controlled by controlling both the amount of aluminum chloride in the catalytic solution and the amount of HCl added as such or made available in the catalytic solution.

Not only is the ratio of $HAlCl_4$ to $AlCl_3$ important in such catalytic polymerization operations as described, but the particular diolefin used as a feed stock is also important. For example, as mentioned before, it is believed that the reason difficulty has existed in preparing polymers having the proper vulcanizable characteristics is that the particular diolefins used in the prior art have served to terminate the reaction before the proper degree of polymerization had been effected. Such high molecular weight polymers produced in the prior art processes have been highly susceptible to oxidation with free oxygen. It is postulated that the molecules of various high molecular weight polymers such as synthetic rubbers and natural rubbers have varying degrees of resistance to oxidation depending on the structural arrangement of the molecule. It is known, for example, that a hydrogen atom on a tertiary carbon or a hydrogen atom on a methylene group adjacent a double bond carbon atom is very easily removed by oxidation while a hydrogen atom on a methylene group adjacent to a double bond carbon containing a methyl group is even more easily removed through oxidation. A still different hydrogen in the molecule of high molecular weight polymers which is less easily removed through oxidation than those mentioned above is the hydrogen on a primary carbon or a hydrogen that is on a carbon atom removed from a double bond carbon. Thus, it it believed that the structural formula of a high molecular weight polymer should contain no tertiary carbon atoms and as few methylene groups as possible. These several different kinds of hydrogens may be represented as follows:

H = hydrogen most difficult to remove through oxidation with $O_2$.

H′ = hydrogen more easily removed than H through oxidation with $O_2$.

H″ = hydrogen more easily removed than H′ through oxidation with $O_2$.

H‴ = hydrogen most easily removed through oxidation with $O_2$.

For example, a typical synthetic rubber produced by polymerization of a mono-olefin with a diolefin is postulated to have the following structural formula:

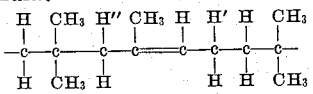

It will be seen in the foregoing structural formula that a methyl group on a double bond carbon is adjacent a carbon atom which has hydrogen that is more easily removed than the hydrogen on a carbon atom which is not adjacent a methyl group adjacent a double bond.

In a second type of synthetic rubber having high molecular weight, it is postulated that a structural arrangement as follows exists:

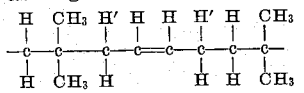

It will be seen that the polymer having the basic structure as given above contains no methyl group adjacent a double bond carbon for activation, and, hence, substantially all of the hydrogens should be fairly resistant to oxidation.

Another type of synthetic rubber produced by the polymerization of isobutylene with 3-methyl-1,3 pentadiene is posturated to have a structural formula as follows:

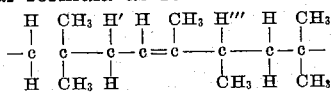

It will be noted that this polymer should have very poor oxidation stability since it has a hydrogen on a tertiary carbon atom, and it is also highly active due to a methyl group on an adjacent double bond carbon atom.

Natural rubber has been postulated to have a structural formula as represented by the basic isoprene molecule taken $n$ times shown below:

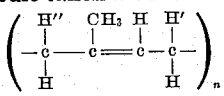

Natural rubber is known to have oxidation instability and this is believed to be explained by the methyl group activation due to the methyl group on the adjacent double bond carbon atom.

The synthetic rubber produced by polymerizing butadiene-1,3 with styrene has a basic structural formula as given below:

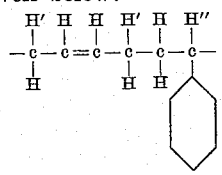

This synthetic rubber does not have any methyl group activation but does have a hydrogen on a tertiary carbon atom allyl to a double bond in a benzene ring. Hence, it should have less oxidation stability than natural rubber or a polybutadiene because of the hydrogen on the tertiary carbon atom allyl to the double bond.

In accordance with the present invention, it is possible to produce high molecular weight polymers resistant to oxidation and having a structural arrangement such that the hydrogens are not easily removed by oxidation. Such a polymer may be produced from isobutylene and 4-methyl-1,3 pentadiene by polymerizing a mixture of the feed stock at a temperature in the range from −120° to −175° F. while carefully controlling the concentration of catalyst and the ratio of HAlCl$_4$ to AlCl$_3$ in the catalytic solution employed to catalyze the reaction. A high molecular weight vulcanizable polymer having any degree of unsaturation desired may be produced by reacting isobutylene and 4-methyl-1,3 pentadiene under the foregoing conditions. It is postulated that such a polymer would have a basic structural formula as follows:

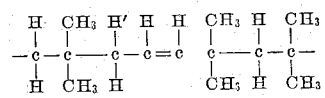

It will be noted that the polymer produced from isobutylene and 4-methyl-1,3 pentadiene should be very stable since it contains only one hydrogen, or, stating this otherwise, one point of activation for each two points available in the polymers produced in the prior art. Furthermore, there should be no limit to the amount of unsaturation that may be put into the molecule as compared with polymers made from isoprene and butadiene since the terminal ending of the growing carbonium ion would always have available a tertiary structure.

The temperatures employed in the practice of the present invention may vary from −120° to −175° F. but preferably should be in the range from −130° to −150° F. Methods of controlling the temperatures of the reacting olefins are well known and do not form a part of my invention.

While 4-methyl-1,3 pentadiene is the diolefin that should be employed in the practice of the present invention, the tertiary mono-olefin may be isobutylene, isopentylene, isohexylene, isoheptylene, iso-octylene, and the like. The relative amounts of the tertiary mono-olefin and 4-methyl-1,3 pentadiene are preferably 27% of the tertiary mono-olefin and 4%, based on the tertiary mono-olefin, of 4-methyl-1,3 pentadiene. However, as mentioned before, the amount of 4-methyl-1,3 pentadiene may be varied widely to produce any degree of unsaturation desired. Thus, polymers having from 2 to 10% unsaturation may be obtained by varying the amount of 4-methyl-1,3 pentadiene in the range from about 3 to 15% by weight of the tertiary mono-olefin, in this particular instance isobutylene.

The remainder of the feed mixture should be a diluent for the reaction such as an alkyl halide and preferably methyl chloride, but other alkyl halides such as ethyl chloride, ethyl bromide, and methyl bromide may be substituted therefor.

The catalyst is a Friedel-Crafts catalyst and is preferably employed as a solution, for example, aluminum chloride in methyl chloride. The concentration of aluminum chloride in the solution may vary in the range from 0.05 to 0.5% by weight of the solvent; 0.3% by weight of aluminum chloride dissolved in methyl chloride gives highly satisfactory results. It is to be understood, of course, that while aluminum chloride in methyl chloride is the preferred catalyst solution, other solvents may be used. As a general statement, it may be said that any solvent unreactive with the aluminum chloride catalyst and the hydrocarbons and which will not form complexes with the catalyst may be used. As examples of such solvents may be mentioned carbon disulfide, carbon tetrachloride, methyl and ethyl chloride and methyl and ethyl bromide.

It is also important in the present invention to control the ratio of HAlCl$_4$ to AlCl$_3$ in the catalyst. The ratio should be controlled in the range between 0.5 to 5:100 and this is preferably accomplished by adding a carefully regulated quantity of hydrogen chloride or other hydrogen chloride-producing material to the catalytic solution. For example, hydrogen chloride may be added to the aluminum chloride dissolved in methyl chloride or water or aqueous solution may be added to such catalytic solutions to produce hydrogen chloride in situ.

As mentioned before, the temperatures may vary from −120° to −175° F., but preferably are controlled between −130° and −150° F. with the lower temperature in the preferred range being the more desirable.

The operation may be carried out in batch or continuous equipment. In a continuous operation when a feed mixture is continuously added to a reaction vessel and product is continuously removed, a feed composition as follows should be used to produce a polymer having about 10% unsaturation and a molecular weight of about 50,000 Staudinger:

Feed composition:
    Isobutylene, wt. percent_____ 27
    4-methyl-1,3 pentadiene, wt. percent__ 1
    Methyl chloride, wt. percent_____ 72
Catalyst composition:
    Aluminum chloride in methyl chloride_ 0.3
    Ratio of $HAlCl_4$ to $AlCl_3$_____ 1:100
    Temperature, °F._____ −130
    Conversion, percent by weight_____ 85–95
    Volumes of feed per volume of catalyst
      per hour_____ 1.0 to 5.0

In the process of the present invention it must be emphasized that 4-methyl-1,3 pentadiene is not equivalent to the diolefins employed in the prior art processes. It is known that other diolefins than 4-methyl-1,3 pentadiene have been used with some success. It must be reiterated, however, that polymers produced in the prior art processes are more susceptible to oxidation by virtue of the foregoing explanations as to the structural arrangements of the high molecular weight polymers. It will be realized from the foregoing descriptions that it is difficult to produce a high molecular weight polymer with any diolefin besides 4-methyl-1,3 pentadiene which will not be susceptible to oxidation. It is to be emphasized that the specific invention described and claimed is a method for producing a polymer resistant to oxidation by employing as the diolefin 4-methyl-1,3 pentadiene and carefully controlling the concentration of aluminum chloride catalyst and also the ratio of $HAlCl_4$ to $AlCl_3$. This may be conveniently accomplished by measuring the electrical conductivity of the catalytic solution. The concentration may be controlled within the proper ranges by injecting sufficient hydrogen chloride or sufficient hydrogen chloride producing material to maintain an electrical conductivity within the range of 1 to 5 mhos. at a temperature of about −130° F.

The nature and objects of the present invention having been completely described and illustrated, what I wish to claim as new and useful and to secure by Letters Patent is:

1. A method for producing a rubbery polymer having improved resistance to oxidation which consists in forming a feed mixture of a major amount of tertiary mono-olefin and a minor amount of 4-methyl-1,3 pentadiene, chilling said feed mixture to a temperature in the range between −120° and −175° F., contacting said chilled feed mixture with a chilled solution of aluminum chloride in an alkyl halide having a concentration of aluminum chloride in said alkyl halide in the range between .05 and 0.5% by weight and a ratio of $HAlCl_4$ to $AlCl_3$ in the range from 0.5 to 5:100 to form a rubbery polymer, and recovering said polymer.

2. A method in accordance with claim 1 in which the tertiary mono-olefin is isobutylene.

3. A method for producing a rubbery polymer having improved resistance to oxidation which consists in forming a feed mixture of a major amount of tertiary mono-olefin and a minor amount of 4-methyl-1,3 pentadiene, chilling said feed mixture to a temperature in the range between −120° and −175° F., contacting said chilled feed mixture with a solution of aluminum chloride in an alkyl halide having a concentration of aluminum chloride in said alkyl halide in the range between about .05 and 0.5% by weight and a ratio of $HAlCl_4$ to $AlCl_3$ in the range from 0.5 to 5:100, said ratio of $HAlCl_4$ to $AlCl_3$ being maintained by introducing into said catalytic solution controlled quantities of an activator capable of providing HCl in said solution, to form a rubbery polymer, and recovering said polymer.

4. A method for producing a rubbery polymer having improved resistance to oxidation which consists in forming a feed mixture containing isobutylene, 4-methyl-1,3 pentadiene, and methyl chloride, said feed mixture containing approximately 27% by weight of isobutylene, 3 to 15% by weight of 4-methyl-1,3 pentadiene based on the isobutylene, and the remainder methyl chloride, forming a catalytic solution comprising aluminum chloride dissolved in methyl chloride in an amount in the range between .05 to 0.5% by weight, said catalytic solution having a ratio of $HAlCl_4$ to $AlCl_3$ in the range from 0.5 to 5:100 which ratio is maintained by introduction into said catalytic solution of an activator providing an amount of HCl sufficient to maintain said ratio, separately chilling said feed mixture and said catalytic solution to a temperature in the range between −120° and −175° F., admixing said chilled feed mixture and said chilled catalytic solution in a polymerization zone to form a polymer product, and recovering said product.

HENRY G. SCHUTZE.

REFERENCES CITED

The following references are of record in the file of this patent:

UNITED STATES PATENTS

| Number | Name | Date |
| --- | --- | --- |
| 2,471,890 | Palmer | May 31, 1949 |

FOREIGN PATENTS

| Number | Country | Date |
| --- | --- | --- |
| 565,974 | Great Britain | Dec. 7, 1944 |

OTHER REFERENCES

India Rubber World, February 1946 (pp. 663–666).